United States Patent
Chen et al.

(10) Patent No.: US 11,681,489 B2
(45) Date of Patent: Jun. 20, 2023

(54) CIRCUIT AND METHOD FOR CONTROLLING AUDIO ADAPTER

(71) Applicant: REALTEK SEMICONDUCTOR CORPORATION, Hsinchu (TW)

(72) Inventors: Ko-Wei Chen, Hsinchu (TW);
Chao-Wei Liu, Hsinchu (TW);
Shu-Yeh Chiu, Hsinchu (TW);
Sheng-Nan Chiu, Hsinchu (TW)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 0 days.

(21) Appl. No.: 17/582,315

(22) Filed: Jan. 24, 2022

(65) Prior Publication Data
US 2022/0261208 A1   Aug. 18, 2022

(30) Foreign Application Priority Data

Feb. 17, 2021   (TW) .................... 110105374

(51) Int. Cl.
*G06F 3/16*     (2006.01)
*G06F 13/38*    (2006.01)
(Continued)

(52) U.S. Cl.
CPC ............ *G06F 3/162* (2013.01); *G06F 13/387* (2013.01); *H04M 1/6008* (2013.01); *H04M 1/724* (2021.01); *G06F 2213/0042* (2013.01)

(58) Field of Classification Search
CPC ...................................................... G11B 27/34
See application file for complete search history.

(56) References Cited

U.S. PATENT DOCUMENTS 8,879,751 B2 * 11/2014 Bonanno ............ H04R 1/1041
381/74
2009/0264147 A1   10/2009 Kuroda et al.

FOREIGN PATENT DOCUMENTS

CN         101300817 A      11/2008

OTHER PUBLICATIONS

OA letter of the counterpart TW application (appl. No. 110105374) dated Sep. 24, 2021Summary of the OA letter:(1) Claim(s) 1-6 is/are rejected under Patent Law Article 22(2) as being unpatentable over reference 1 (CN 101300817A). (2) Claim(s) 7-10 is/are rejected under Patent Law Article 22(2) as being unpatentable over reference 1 (CN 101300817A).)Claim correspondence between the TW counterpart application and the instant U.S. Appl. No.: Claims 1-10 in the TW counterpart application correspond to claims 1-10 in the instant U.S. Appl. No., respectively.

* cited by examiner

*Primary Examiner* — Henry Tsai
*Assistant Examiner* — Juanito C Borromeo
(74) *Attorney, Agent, or Firm* — WPAT, P.C

(57) ABSTRACT

A circuit and a method for controlling an audio adapter are provided. The audio adapter includes a button and a microphone, and the microphone is adapted for generating a recorded data. The control circuit includes a button detection circuit, a first-in, first-out (FIFO) data buffer, a USB endpoint buffer, a mute circuit and a USB endpoint control circuit. The button detection circuit is used for detecting whether the button is triggered. The FIFO data buffer is used for storing the recorded data. The USB endpoint buffer is used for storing the recorded data. The mute circuit is used for controlling whether the recorded data is transmitted to the USB endpoint buffer according to whether the button is triggered. The USB endpoint control circuit is used for (Continued)

controlling whether the audio adapter outputs the recorded data according to whether the button is triggered.

10 Claims, 7 Drawing Sheets

(51) Int. Cl.
*H04M 1/724* (2021.01)
*H04M 1/60* (2006.01)

CIRCUIT AND METHOD FOR CONTROLLING AUDIO ADAPTER

BACKGROUND OF THE INVENTION

1. Field of the Invention

The present invention generally relates to audio adapters (also referred to as dongles), and, more particularly, to a control circuit and a control method of the audio adapters.

2. Description of Related Art

The conventional Universal Serial Bus (USB) to audio jack (which includes, but is not limited to, 3.5 mm mini jack) audio adapters often include a microphone and at least one physical button. The microphone is used for recording, and the physical button can be used to control the audio adapter (e.g., start/stop music playback, or start/stop recording). Unfortunately, noises (such as pressing sounds, click sounds, friction sounds, etc.) are inevitable when the button is being pressed, causing disturbing pop sounds in the recorded audio.

Therefore, a control circuit and a control method of an audio adapter are needed to avoid disturbing pop sounds in the recorded audio.

SUMMARY OF THE INVENTION

In view of the issues of the prior art, an object of the present invention is to provide a control circuit and a control method of an audio adapter, so as to make an improvement to the prior art.

According to one aspect of the present invention, a control circuit for an audio adapter is provided. The audio adapter includes a button and a microphone which is adapted for generating a recorded data. The control circuit includes a button detection circuit, a first-in, first-out (FIFO) data buffer, a USB endpoint buffer, a mute circuit, and a USB endpoint control circuit. The button detection circuit is configured to detect whether the button is triggered. The first-in, first-out (FIFO) data buffer is configured to store the recorded data. The USB endpoint buffer is configured to store the recorded data. The mute circuit is coupled to the button detection circuit and coupled between the FIFO data buffer and the USB endpoint buffer, and configured to control whether the recorded data is transmitted to the USB endpoint buffer according to whether the button is triggered. The USB endpoint control circuit is coupled to the button detection circuit and the USB endpoint buffer and configured to control whether the audio adapter outputs the recorded data according to whether the button is triggered.

According to another aspect of the present invention, a control method of an audio adapter is provided. The audio adapter includes a button and a microphone which generates a recorded data. The control method includes the following steps: providing a first-in, first-out (FIFO) data buffer and a USB endpoint buffer; storing the recorded data in the FIFO data buffer; detecting whether the button of the audio adapter is triggered; and preventing the recorded data from entering the USB endpoint buffer and controlling the audio adapter not to output the recorded data when the button is triggered.

These and other objectives of the present invention no doubt become obvious to those of ordinary skill in the art after reading the following detailed description of the preferred embodiments with reference to the various figures and drawings.

DETAILED DESCRIPTION OF THE EMBODIMENTS

The following description is written by referring to terms of this technical field. If any term is defined in this specification, such term should be interpreted accordingly. In addition, the connection between objects or events in the below-described embodiments can be direct or indirect provided that these embodiments are practicable under such connection. Said "indirect" means that an intermediate object or a physical space exists between the objects, or an intermediate event or a time interval exists between the events.

The disclosure herein includes a circuit and a method for controlling audio adapters. On account of that some or all elements of the control circuit of the audio adapters could be known, the detail of such elements is omitted provided that such detail has little to do with the features of this disclosure, and that this omission nowhere dissatisfies the specification and enablement requirements. Some or all of the processes of the control method of the audio adapters can be performed by the control circuit of the audio adapters or its equivalent. A person having ordinary skill in the art can choose components or steps equivalent to those described in this specification to carry out the present invention, which means that the scope of this invention is not limited to the embodiments in the specification.

Figure 1:
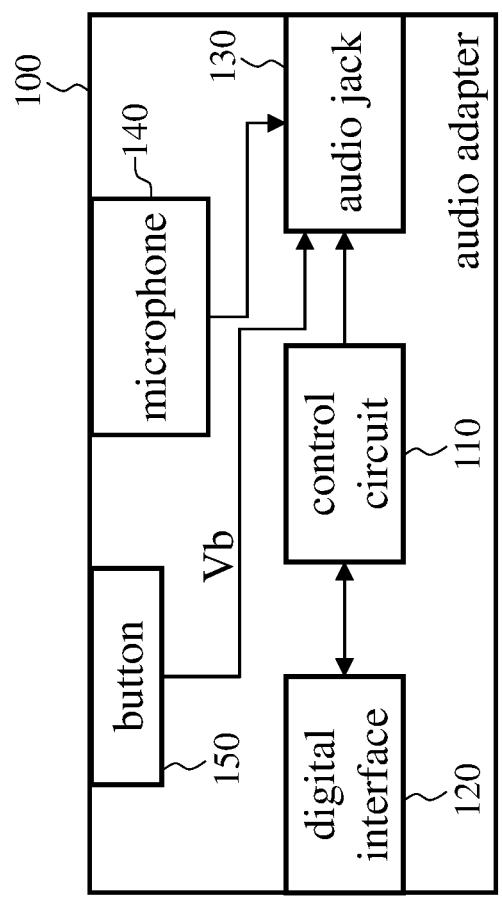
FIG. 1 illustrates a functional block diagram of the audio adapter according to an embodiment of the present invention.

FIG. 1 is a functional block diagram of the audio adapter according to an embodiment of the present invention. The audio adapter 100 includes a control circuit 110, a digital interface 120, an audio jack 130, a microphone 140, and a button 150. The control circuit 110 is coupled to the digital interface 120 and the audio jack 130. The digital interface 120 is used to connect to a host (not shown), and the audio jack 130 is used to connect to an audio output device, the microphone 140, and the button 150.

In some embodiments, the digital interface 120 is a USB interface, and the host is, for example, an electronic device with a USB interface. The electronic device includes, but is not limited to, computers and portable electronic devices such as mobile phones, tablets, notebook computers, audio/video players, etc.

In some embodiments, the audio jack 130 is a 3.5 mm mini jack, and the audio output device includes, but is not limited to, an earphone device and a headset.

One of the functions of the audio adapter 100 is to convert the digital audio that the host provides into the analog audio that can be outputted through the audio jack 130. Another function of the audio adapter 100 is to record through the microphone 140. The microphone 140 generates recorded data and outputs the recorded data to the control circuit 110. The control circuit 110 processes (including, but not limited to, analog-to-digital conversion) the recorded data, and transmits the processed recorded data to the host through the digital interface 120 for processing (e.g., for storage).

After the button 150 is pressed, a pressing signal Vb (such as a voltage signal) is generated. The control circuit 110 knows whether the button 150 is pressed by detecting the pressing signal Vb. The user can control the audio adapter 100 by pressing the button 150, for example, to start/stop music playback, or start/stop recording. In some embodiments, the button 150 may be a mechanical button.

Figure 2:
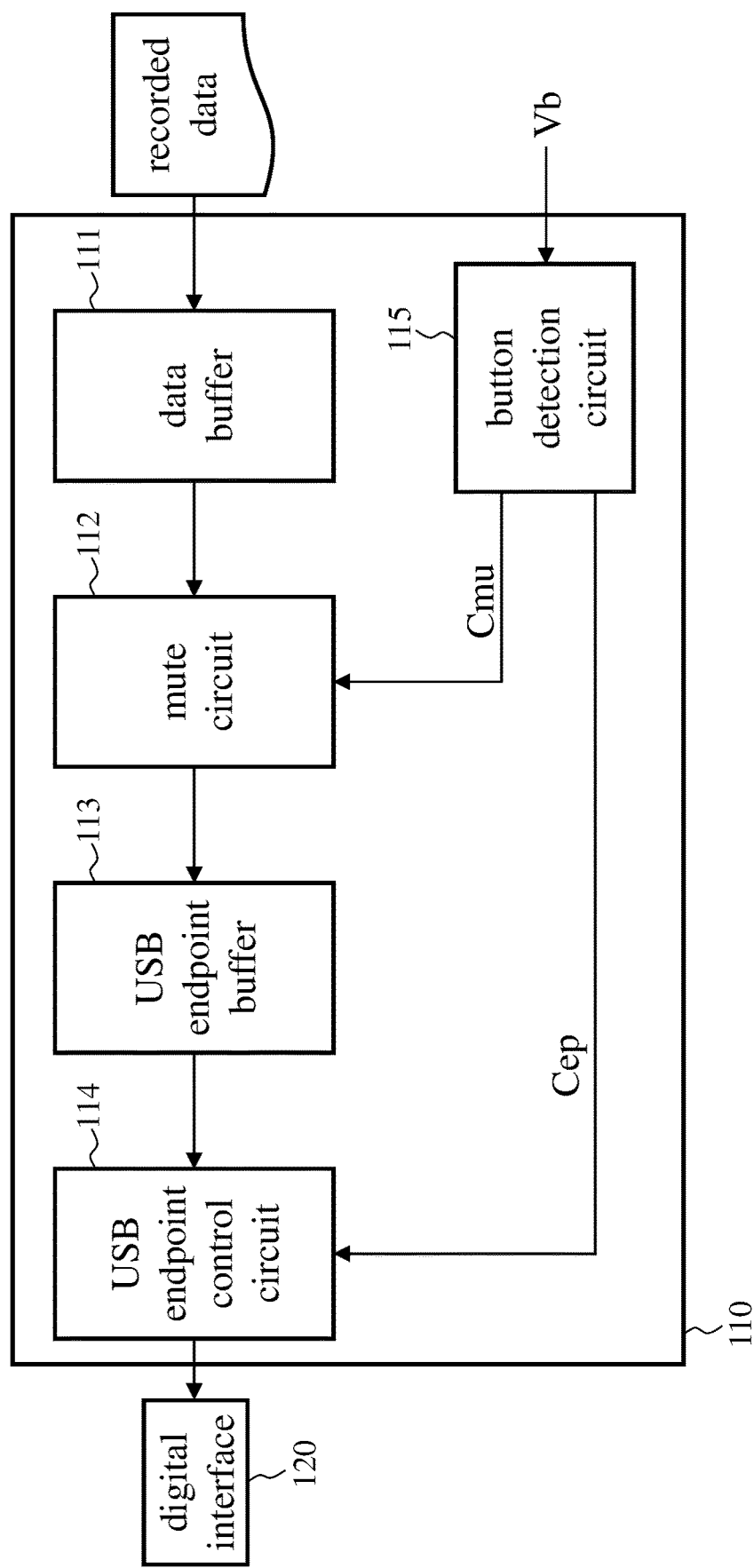
FIG. 2 illustrates a functional block diagram of the control circuit of the audio adapter according to an embodiment of the present invention.

FIG. 2 is a functional block diagram of the control circuit 110 of the audio adapter 100 according to an embodiment of the present invention. The control circuit 110 includes a data buffer 111, a mute circuit 112, a USB endpoint buffer 113, a USB endpoint control circuit 114, and a button detection circuit 115. The button detection circuit 115 is coupled or electrically connected to the mute circuit 112 and the USB endpoint control circuit 114, and the data buffer 111, the mute circuit 112, the USB endpoint buffer 113, and the USB endpoint control circuit 114 are sequentially coupled.

The button detection circuit 115 receives the pressing signal Vb, and detects whether the button 150 is pressed based on the voltage amplitude of the pressing signal Vb. When detecting that the button 150 is pressed, the button detection circuit 115 generates a mute control signal Cmu and a USB endpoint control signal Cep to control the mute circuit 112 and the USB endpoint control circuit 114, respectively.

The data buffer 111 is a first-in, first-out (FIFO) data buffer for storing the recorded data. When the data buffer 111 is full, the oldest recorded data in the data buffer 111 will be overwritten by the newly generated recorded data.

Figure 3:
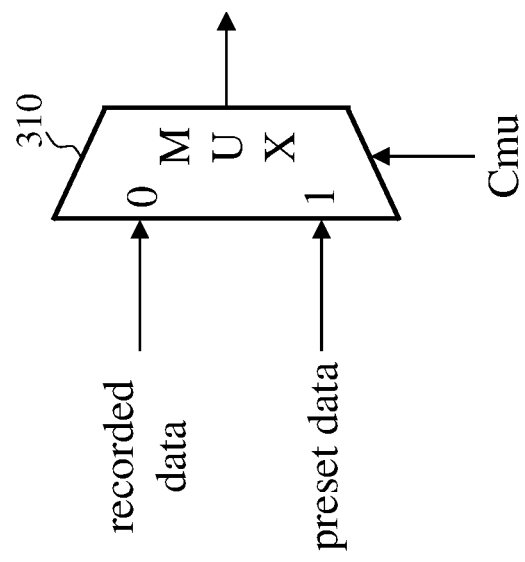
FIG. 3 illustrates a functional block diagram of a mute circuit according to an embodiment.

The mute circuit 112, which is coupled between the data buffer 111 and the USB endpoint buffer 113, controls whether the recorded data is transmitted to the USB endpoint buffer 113 according to whether the button 150 is pressed. More specifically, please refer to FIG. 3, which is a functional block diagram of the mute circuit 112. In the embodiment of FIG. 3, the mute circuit 112 is embodied by the multiplexer (MUX) 310. One input terminal of the multiplexer 310 receives the recorded data, the other input terminal of the multiplexer 310 receives the preset data, and the mute control signal Cmu controls the multiplexer 310 to output the recorded data (when the mute control signal Cmu=0, which is equivalent to the mute circuit 112 being disabled or inactive) or the preset data (when the mute control signal Cmu=1, which is equivalent to the mute circuit 112 being enabled or active). In other words, the multiplexer 310 selectively outputs the recorded data according to the mute control signal Cmu. In some embodiments, the preset data includes one or more bits "0."

Figure 4:
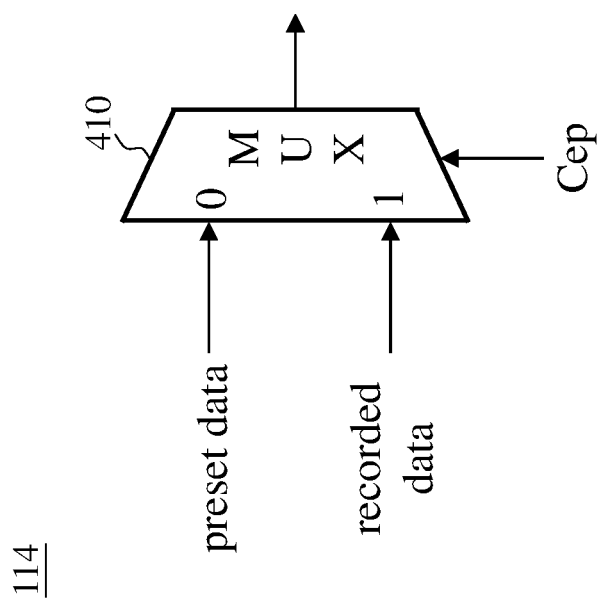
FIG. 4 illustrates a functional block diagram of a USB endpoint control circuit according to an embodiment.

In reference to FIG. 2, the USB endpoint buffer 113, which is coupled between the mute circuit 112 and the USB endpoint control circuit 114, stores the recorded data. The USB endpoint control circuit 114 is coupled to the USB endpoint buffer 113, the button detection circuit 115, and the digital interface 120. In other words, the output of the USB endpoint control circuit 114 is transmitted to the host through the digital interface 120. The USB endpoint control circuit 114 controls whether the recorded data is transmitted to the digital interface 120 (which is equivalent to controlling whether the audio adapter 100 outputs the recorded data) according to whether the button 150 is pressed. More specifically, reference is made to FIG. 4, which is a functional block diagram of the USB endpoint control circuit 114 according to an embodiment. In the embodiment of FIG. 4, the USB endpoint control circuit 114 is embodied by the multiplexer 410. One input terminal of the multiplexer 410 receives the recorded data, the other input terminal of the multiplexer 410 receives the preset data, and the USB endpoint control signal Cep controls the multiplexer 410 to output the recorded data (when the USB endpoint control signal Cep=1, which is equivalent to the data uploading function of the USB endpoint control circuit 114 being enabled) or the preset data (when the USB endpoint control signal Cep=0, which is equivalent to the data uploading function of the USB endpoint control circuit 114 being disabled). In other words, the multiplexer 410 selectively outputs the recorded data according to the USB endpoint control signal Cep.

The USB endpoint buffer 113 is commonly found in the electronic devices that implement USB. The implementation details of the USB endpoint buffer 113 are well known to people having ordinary skill in the art, and the details are thus omitted for brevity.

Figure 5:
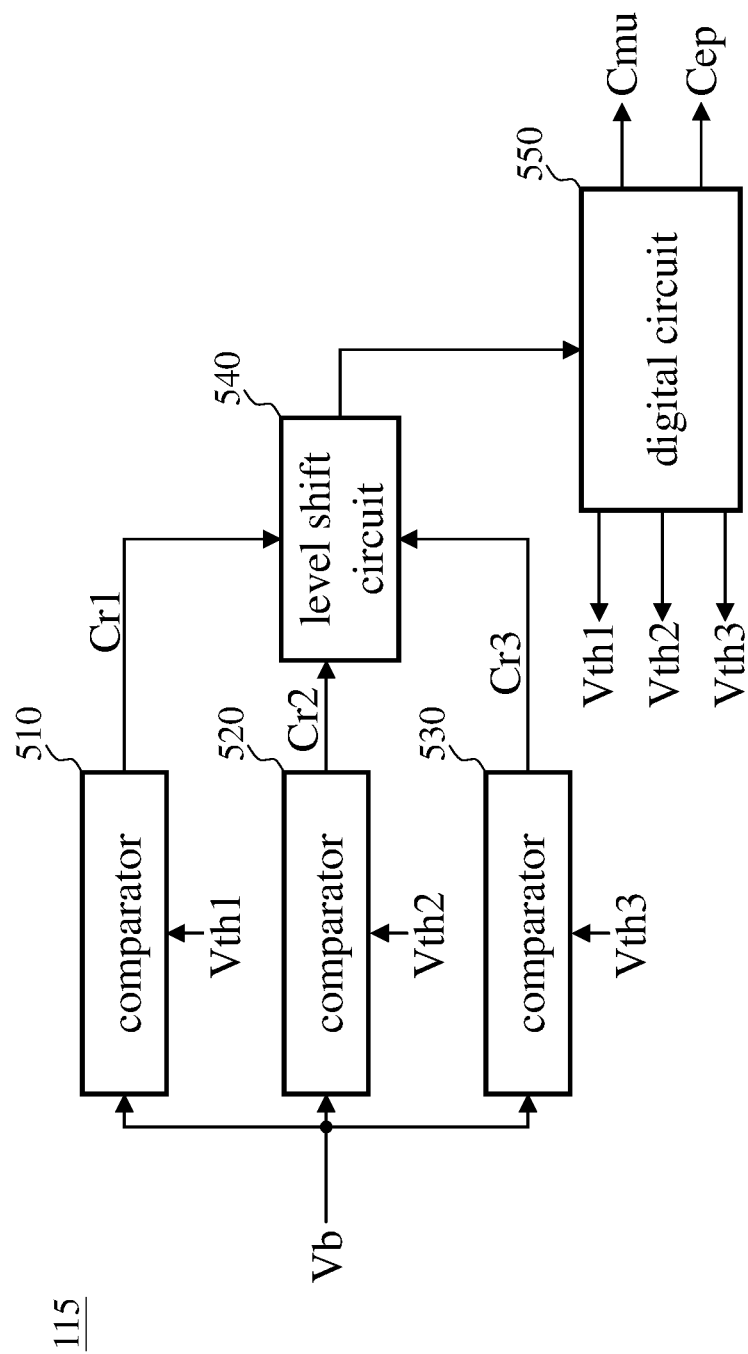
FIG. 5 illustrates a functional block diagram of the button detection circuit according to an embodiment of the present invention.

Reference is made to FIG. 5, which is a functional block diagram of the button detection circuit 115 according to an embodiment of the present invention. The button detection circuit 115 includes a comparator 510, a comparator 520, a comparator 530, a level shift circuit 540, and a digital circuit 550. The comparator 510, the comparator 520, and the comparator 530 respectively compare the pressing signal Vb with the threshold Vth1, the threshold Vth2, and the threshold Vth3 to generate a comparison signal Cr1, a comparison signal Cr2, and a comparison signal Cr3, respectively. The threshold Vth1, the threshold Vth2, and the threshold Vth3 are generated by the digital circuit 550. The level shift circuit 540 is coupled to the comparator 510, the comparator 520, and the comparator 530 for level shifting the comparison signal Cr1, the comparison signal Cr2, and the comparison signal Cr3 (i.e., converting the potential or voltage of the comparison signal Cr1, the comparison signal Cr2, and the comparison signal Cr3). The digital circuit 550, which is coupled to the level shift circuit 540, detects whether the button 150 is pressed according to the level-shifted comparison signal Cr1, the level-shifted comparison signal Cr2, and the level-shifted comparison signal Cr3, and outputs the mute control signal Cmu and the USB endpoint control signal Cep according to the detection result. For example (where Vth3<Vth2<Vth1), when Vth2<Vb<Vth1, the digital circuit 550 determines that the button 150 is pressed and thus controls the mute control signal Cmu=1 and the USB endpoint control signal Cep=0, and when Vth3<Vb<Vth2, the digital circuit 550 determines that the button 150 is released and thus controls the mute control signal Cmu=0 and the USB endpoint control signal Cep=1. The mute control signal Cmu and the USB endpoint control signal Cep can be the unsolicited responses.

In some embodiments, people having ordinary skill in the art can design the digital circuit 550 based on the above discussions. In other words, the digital circuit 550 can be an application specific integrated circuit (ASIC) or embodied by circuits or hardware such as a programmable logic device (PLD).

In some embodiments, when the first input terminals of the multiplexer 310 and the multiplexer 410 (i.e., the input terminals corresponding to bit "0") both receive the recorded data, and the second input terminals of the multiplexer 310 and the multiplexer 410 (i.e., the input terminals corresponding to bit "1") both receive the preset data, the mute control signal Cmu and the USB endpoint control signal Cep can be the same control signal.

In some embodiments, there is a detection delay between the time at which the button 150 has just been pressed and the time at which the button detection circuit 115 detects that the button 150 is pressed, and during the detection delay, the microphone 140 generates the recorded data of data amount M, which is, for example, several KB to several MB, depending on the encoding format and/or sampling frequency employed by the control circuit 110. The capacity of the data buffer 111 is designed to be slightly greater than the data amount M. In this way, the pop sounds as a result of the pressing of the button 150 will be removed from the data buffer 111 during the period when the mute circuit 112 is active or enabled (i.e., the period when the data in the data buffer 111 is prohibited, prevented, or stopped from being transmitted to the USB endpoint buffer 113); as a result, the pop sounds will not be transmitted to the host through the digital interface 120. The removal of the pop sounds from the data buffer 111 during the period when the mute circuit 112 is active or enabled can be regarded as the data in the data buffer 111 corresponding to the pop sounds being overwritten by the newly generated recorded data during same period.

For example, the detection delay discussed above is about 20 ms, and the capacity of the data buffer 111 is equivalent to the size of 25 ms' worth of recorded data. In other words, in some embodiments, the capacity of the data buffer 111 can be designed to be approximately 1.25 (=25/20) times the data amount M.

Figure 6:
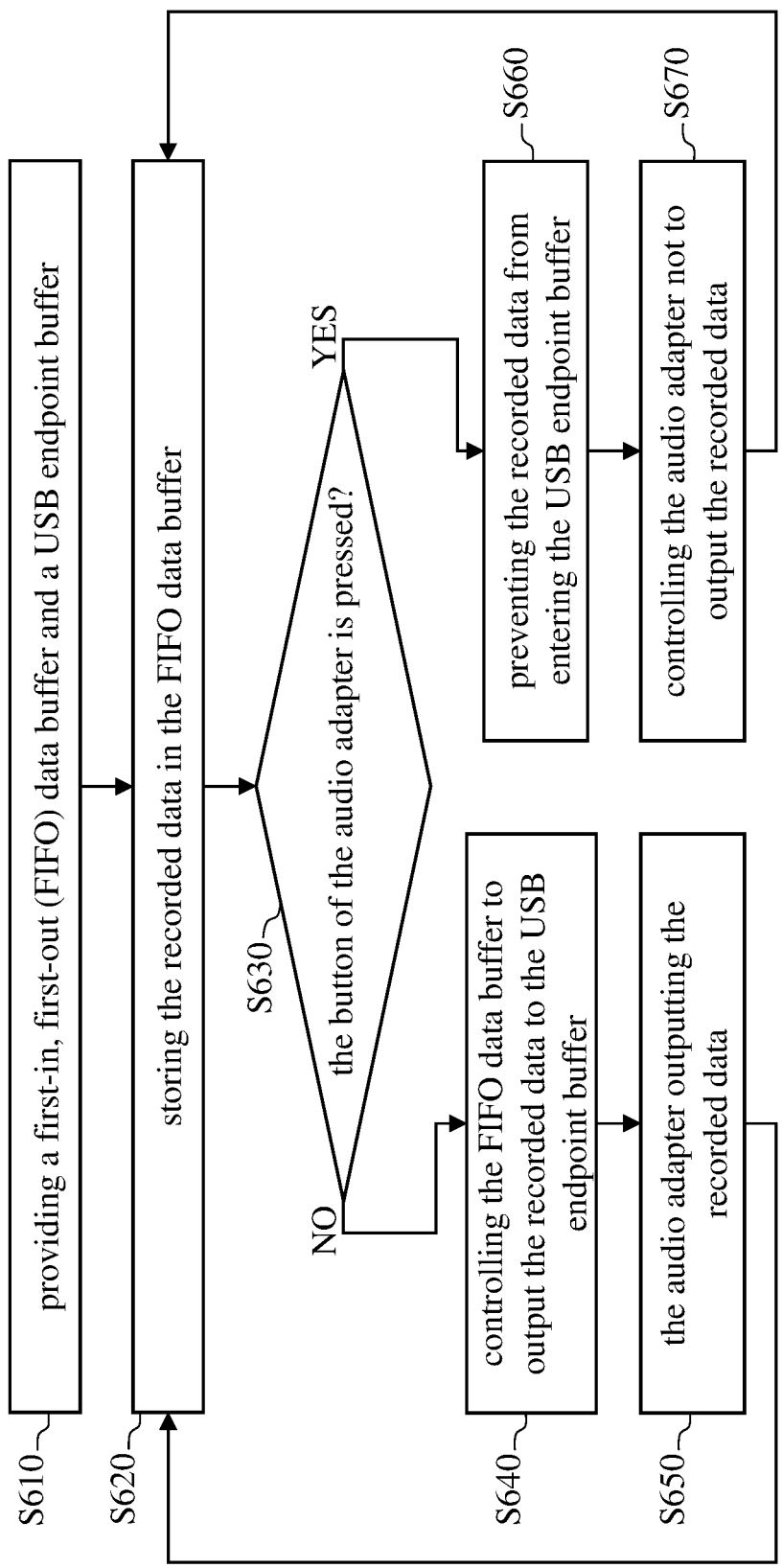
FIG. 6 illustrates a flowchart of the control method of the audio adapter according to an embodiment of the present invention.

In addition to the audio adapter 100 and its control circuit 110 discussed above, the present invention also correspondingly provides a method of controlling an audio adapter. This method can be applied to an audio adapter with a recording function (e.g., the audio adapter 100) and can avoid the pop sounds in the recorded audio. This method can be performed by the control circuit 110 or its equivalent device. FIG. 6 is a flowchart of the method according to one embodiment, including the following steps.

Step S610: providing a first-in, first-out (FIFO) data buffer (such as the data buffer 111) and a USB endpoint buffer (such as the USB endpoint buffer 113).

Step S620: storing the recorded data generated by the microphone in the FIFO data buffer.

Step S630: detecting whether the button of the audio adapter is pressed. When the detection result shows that the button is not pressed (i.e., the result of step S630 is NO), steps S640 and S650 are performed. When the detection result shows that the button is pressed (i.e., the result of step S630 is YES), steps S660 and S670 are performed.

Step S640: controlling the FIFO data buffer to output the recorded data to the USB endpoint buffer.

Step S650: the audio adapter outputting the recorded data stored in the USB endpoint buffer through a digital interface.

Step S660: preventing the recorded data from entering the USB endpoint buffer, which is equivalent to controlling the mute circuit 112 to be active (i.e., enabled).

Step S670: controlling the audio adapter not to output the recorded data, which is equivalent to disabling the data uploading function of the USB endpoint control circuit 114.

Figure 7:
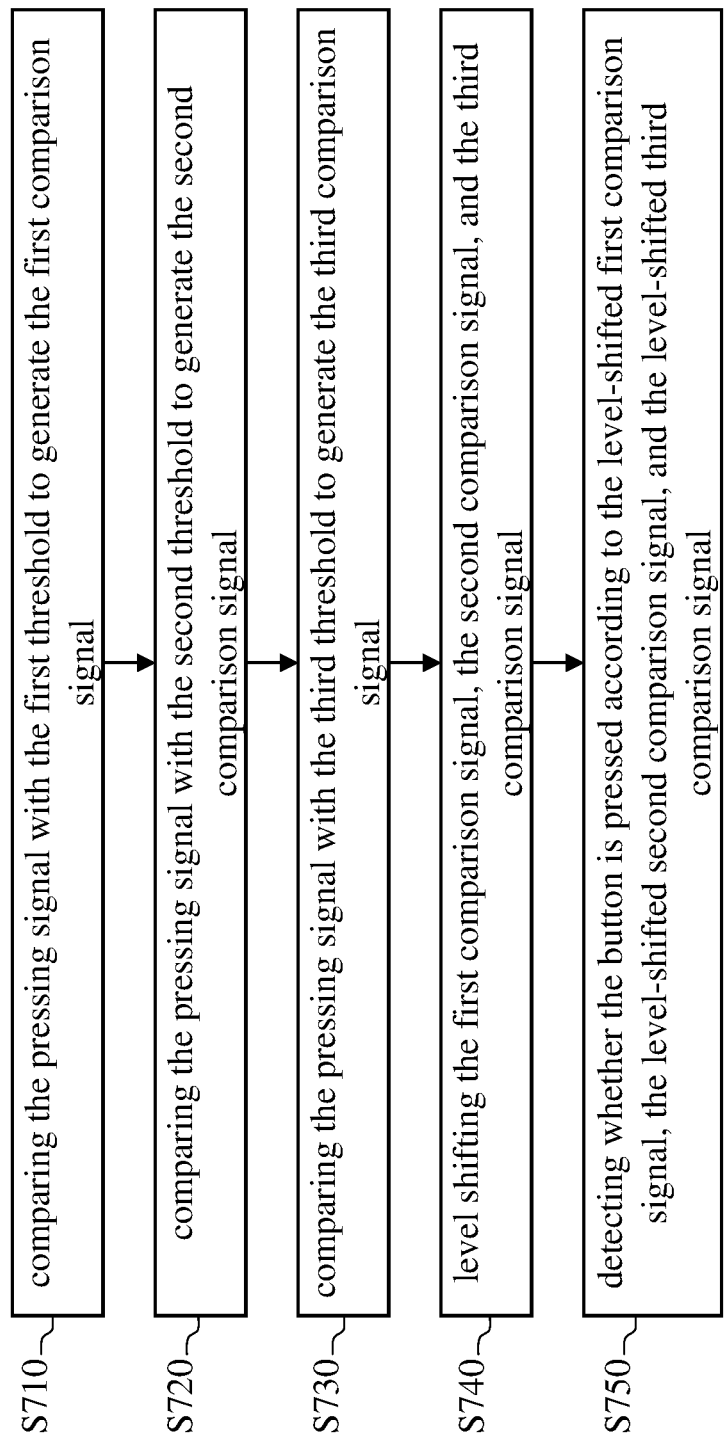
FIG. 7 illustrates the detailed flow of step S630 in FIG. 6.

FIG. 7 shows the detailed flow of step S630 in FIG. 6, including the following steps.

Step S710: comparing the pressing signal with the first threshold to generate the first comparison signal.

Step S720: comparing the pressing signal with the second threshold to generate the second comparison signal.

Step S730: comparing the pressing signal with the third threshold to generate the third comparison signal.

Step S740: level shifting the first comparison signal, the second comparison signal, and the third comparison signal.

Step S750: detecting whether the button is pressed according to the level-shifted first comparison signal, the level-shifted second comparison signal, and the level-shifted third comparison signal.

As mentioned in the discussions about the button detection circuit 115, there may be a detection delay in step S630.

With the circuit and method discussed above, the present invention can prevent the audio adapter from transmitting the pop sounds caused by the pressing of the button during the recording process to the host. Therefore, the user experience can be improved.

Since a person having ordinary skill in the art can appreciate the implementation detail and the modification thereto of the present method invention through the disclosure of the device invention, repeated and redundant description is thus omitted. Furthermore, the shape, size, and ratio of any element in the disclosed figures are exemplary for understanding, not for limiting the scope of this invention. Moreover, there is no step sequence limitation for the method inventions as long as the execution of each step is applicable. In some instances, the steps can be performed simultaneously or partially simultaneously.

The aforementioned descriptions represent merely the preferred embodiments of the present invention, without any intention to limit the scope of the present invention thereto. Various equivalent changes, alterations, or modifications based on the claims of the present invention are all consequently viewed as being embraced by the scope of the present invention.

What is claimed is:

1. A control circuit for an audio adapter that includes a button and a microphone, the microphone adapted for generating a recorded data, and the control circuit comprising:
    a button detection circuit configured to detect whether the button is triggered;
    a first-in, first-out (FIFO) data buffer configured to store the recorded data;
    a USB endpoint buffer configured to store the recorded data;
    a mute circuit coupled to the button detection circuit and coupled between the FIFO data buffer and the USB endpoint buffer and configured to control whether the recorded data is transmitted to the USB endpoint buffer according to whether the button is triggered; and
    a USB endpoint control circuit coupled to the button detection circuit and the USB endpoint buffer and configured to control whether the audio adapter outputs the recorded data according to whether the button is triggered.

2. The control circuit of claim 1, wherein when the button is triggered, the button generates a pressing signal, and the button detection circuit comprises:
    a first comparator for comparing the pressing signal with a first threshold to generate a first comparison signal;
    a second comparator for comparing the pressing signal with a second threshold to generate a second comparison signal;
    a third comparator for comparing the pressing signal with a third threshold to generate a third comparison signal;
    a level shift circuit, coupled to the first comparator, the second comparator, and the third comparator, for level shifting the first comparison signal, the second comparison signal, and the third comparison signal; and a digital circuit, coupled to the level shift circuit, for detecting whether the button is triggered according to the level-shifted first comparison signal, the level-shifted second comparison signal, and the level-shifted third comparison signal.

3. The control circuit of claim 1, wherein when the button detection circuit detects that the button is triggered, the button detection circuit generates a mute control signal, and the mute circuit comprises:
a multiplexer that receives the recorded data and selectively outputs the recorded data according to the mute control signal.

4. The control circuit of claim 1, wherein when the button detection circuit detects that the button is triggered, the button detection circuit generates a USB endpoint control signal, and the USB endpoint control circuit comprises:
a multiplexer that receives the recorded data and selectively outputs the recorded data according to the USB endpoint control signal.

5. The control circuit of claim 1, wherein the button detection circuit has a detection delay, and a capacity of the FIFO data buffer is greater than a data amount of the recorded data that the microphone generates during the detection delay.

6. The control circuit of claim 5, wherein the capacity of the FIFO data buffer is 1.25 times the data amount.

7. A control method of an audio adapter, the audio adapter comprising a button and a microphone, and the microphone generating a recorded data, the control method comprising:
providing a first-in, first-out (FIFO) data buffer and a USB endpoint buffer;
storing the recorded data in the FIFO data buffer;
detecting whether the button of the audio adapter is triggered; and
preventing the recorded data from entering the USB endpoint buffer and controlling the audio adapter not to output the recorded data when the button is triggered.

8. The control method of claim 7, wherein when the button is triggered, the button generates a pressing signal, and the step of detecting whether the button of the audio adapter is triggered comprises:
comparing the pressing signal with a first threshold to generate a first comparison signal;
comparing the pressing signal with a second threshold to generate a second comparison signal;
comparing the pressing signal with a third threshold to generate a third comparison signal;
level shifting the first comparison signal, the second comparison signal, and the third comparison signal; and
detecting whether the button is triggered according to the level-shifted first comparison signal, the level-shifted second comparison signal, and the level-shifted third comparison signal.

9. The control method of claim 7, wherein the step of detecting whether the button of the audio adapter is triggered has a detection delay, and a capacity of the FIFO data buffer is greater than a data amount of the recorded data that the microphone generates during the detection delay.

10. The control method of claim 9, wherein the capacity of the FIFO data buffer is 1.25 times the data amount.

* * * * *